US008512422B2

(12) United States Patent
Pinwill et al.

(10) Patent No.: US 8,512,422 B2
(45) Date of Patent: *Aug. 20, 2013

(54) SOLID ELECTROLYTIC CAPACITOR CONTAINING AN IMPROVED MANGANESE OXIDE ELECTROLYTE

(75) Inventors: Ian Pinwill, Devon (GB); David Masheder, Devon (GB); Silvie Vilcova, Lanskroun (CZ); Petr Stojan, Kostelec n. Orlici (CZ); Jiri Hurt, Ceska Trebova (CZ); Ivan Horacek, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 230 days.

This patent is subject to a terminal disclaimer.

(21) Appl. No.: 13/118,661

(22) Filed: May 31, 2011

(65) Prior Publication Data
US 2011/0317335 A1    Dec. 29, 2011

Related U.S. Application Data

(60) Provisional application No. 61/357,672, filed on Jun. 23, 2010, provisional application No. 61/366,657, filed on Jul. 22, 2010.

(51) Int. Cl.
*H01G 9/00*    (2006.01)
(52) U.S. Cl.
USPC ........................................ 29/25.03
(58) Field of Classification Search
None
See application file for complete search history.

(56) References Cited

U.S. PATENT DOCUMENTS

| | | | |
|---|---|---|---|
| 3,067,243 A | 12/1962 | Richter et al. |
| 3,337,429 A | 8/1967 | Zind |
| 3,627,694 A | 12/1971 | Mackey |
| 3,773,539 A | 11/1973 | Sato et al. |
| 4,042,420 A | 8/1977 | Nishino et al. |
| 4,072,586 A | 2/1978 | De Nora et al. |

(Continued)

FOREIGN PATENT DOCUMENTS

| | | |
|---|---|---|
| GB | 2443503 | 5/2008 |
| GB | 2445673 | 5/2008 |
| GB | 2458550 | 3/2009 |
| GB | 2456858 | 7/2009 |

OTHER PUBLICATIONS

Search Report for GB1110148.2 dated Oct. 18, 2011, 3 pages.

(Continued)

*Primary Examiner* — Seahvosh Nikmanesh
(74) *Attorney, Agent, or Firm* — Dority & Manning, P.A.

(57) ABSTRACT

A solid electrolytic capacitor that contains an anode body formed from an electrically conductive powder and a dielectric coating located over and/or within the anode body is provided. The powder has a high specific charge and in turn a relative dense packing configuration. Despite being formed from such a powder, the present inventors have discovered that a manganese precursor solution (e.g., manganese nitrate) can be readily impregnated into the pores of the anode. This is accomplished, in part, through the use of a dispersant in the precursor solution that helps minimize the likelihood that the manganese oxide precursor will form droplets upon contacting the surface of the dielectric. Instead, the precursor solution can be better dispersed so that the resulting manganese oxide has a "film-like" configuration and coats at least a portion of the anode in a substantially uniform manner. This improves the quality of the resulting oxide as well as its surface coverage, and thereby enhances the electrical performance of the capacitor.

21 Claims, 13 Drawing Sheets

(56) References Cited

U.S. PATENT DOCUMENTS

| | | | |
|---|---|---|---|
| 4,184,192 A | 1/1980 | Yoshida et al. | |
| 4,243,503 A | 1/1981 | Lieb et al. | |
| 4,302,301 A | 11/1981 | Tierman | |
| 5,268,408 A | 12/1993 | Milner | |
| 5,560,761 A | 10/1996 | Naito | |
| 5,622,746 A | 4/1997 | Hahn et al. | |
| 5,629,830 A | 5/1997 | Yamagami et al. | |
| 6,336,944 B1 | 1/2002 | Shimamoto et al. | |
| 6,337,160 B1 | 1/2002 | Hilarius et al. | |
| 6,377,443 B1 | 4/2002 | Hahn et al. | |
| 6,689,187 B2 | 2/2004 | Oda | |
| 6,849,134 B2 | 2/2005 | Henley et al. | |
| 6,939,528 B2 | 9/2005 | Davis et al. | |
| 6,982,865 B2 | 1/2006 | Kawata et al. | |
| 2010/0302712 A1 | 12/2010 | Zednicek et al. | |
| 2011/0317334 A1* | 12/2011 | Pinwill et al. | 361/525 |

OTHER PUBLICATIONS

Article—Dias et al., "On the performance of pyrolytic $MnO_2$/tantalum capacitors: Columnar vs. nanocrystalline cathodic layers," *Acta Materialia*, vol. 55, Issue 11, Jun. 2007, pp. 3757-3763.

Article—Kabir-ud-Din et al., "Effect of surfactants on the oxidation of oxalic acid by soluble colloidal $MnO_2$," *Colloids and Surfaces A: Physicochem. Eng. Aspects*, vol. 234, 2004, pp. 159-164.

Article—Perez-Benito et al., "A Kinetic Study of the Reaction between Soluble (Colloidal) Manganese Dioxide and Formic Acid," *Journal of Colloid and Interface Science*, vol. 149, No. 1, Mar. 1, 1992, pp. 92-97.

Article—Witzemann, Edgar J., "A New Method of Preparation and Some Interesting Transformations of Colloidal Manganese Dioxide," *J. Am. Chem. Soc.*, vol. 37, No. 5, May 1915, pp. 1079-1091.

Paper—Dias et al., "Study of $MnO2$ Coverage on Ta Capacitors with High CV Powders," presented at 2007 Electronics Components, Assemblies, and Materials Association and CARTS Europe 2007 Symposium, 13 pages.

Paper—Freeman et al., "Stable, Reliable, and Efficient Tantalum Capacitors," presented at 2008 ECA (Electronics Components, Assemblies & Materials Associate) and CARTS USA 2008, $28^{th}$ Symposium for Passive Electronics, 6 pages.

Paper—Horacek et al., "High CV Tantalum Capacitors—Challenges and Limitations," presented at The $19^{th}$ Annual Passive Components Symposium & Exhibition, Mar. 30-Apr. 2, 2009, 15 pages.

Paper—Sanchez-Monjaras et al., "Desarrollo e implementación de un proceso de impregnación y conversión para polvos de alta carga (CV/gr)," 2009, 7 pages.

Technical Information—Gill, John, "Basic Tantalum Capacitor Technology," AVX Ltd., Jul. 19, 2004, 7 pages.

Technical Information—Gill, John, "Surge in Solid Tantalum Capacitors," AVX Ltd., 1995, 16 pages.

Technical Information—Franklin, W. R., "Surge Current Testing of Resin Dipped Tantalum Capacitors," AVX Limited, 1985, 7 pages.

Technical Information—Horacek et al., "High CV Tantalum Capacitors—Challenges and Limitations," AVX, CARTS USA 2009, 11 pages.

Product Information on Darvan® 1 Spray Dried from R. T. Vanderbilt Company, Inc., Jun. 5, 2008, 1 pages.

Product Information on DAXAD Dispersants from GEO Specialty Chemicals, May 2006, 2 pages.

Product Information on Proxmat PL-C 753 FP from Synthron, 15 pages.

Product Information on Triton Nonionic Surfactant X-100 from Shun Chia Industrial Company Limited, 5 pages.

Safety Data Sheet on Erkantol NR from LanXess, Jul. 26, 2004, 4 pages.

Related U.S. Patent Application Form.

\* cited by examiner

SOLID ELECTROLYTIC CAPACITOR CONTAINING AN IMPROVED MANGANESE OXIDE ELECTROLYTE

RELATED APPLICATIONS

The present application claims priority to Provisional Application Ser. No. 61/357,672 (filed on Jun. 23, 2010) and Provisional Application Ser. No. 61/366,657 (filed on Jul. 22, 2010), both which are incorporated herein in their entirety by reference thereto.

BACKGROUND OF THE INVENTION

Manganese dioxide is known and widely used as a solid electrolyte in electrolyte capacitors. Such capacitors are conventionally formed by first anodizing a valve-metal anode (e.g., tantalum) to form a dielectric oxide coating, and thereafter immersing the oxide-coated anode in an aqueous solution of manganese nitrate. After a sufficient period of time, the wet anode is heated to cause pyrolytic decomposition of the manganese nitrate to manganese dioxide. To achieve the desired thickness of the solid electrolyte, the steps of immersion and heating are often repeated multiple times. Unfortunately, one problem with conventional manganizing techniques is that the thickness of the resulting manganese dioxide is often greater at certain locations of the anode (e.g., edges), which can lead to poor electrical performance. Various techniques have been employed in an attempt to address these problems. For example, surfactants have been employed in the manganese nitrate solution to substantially reduce its surface tension and improve the wettability of the surface of the oxide-coated anode. One such surfactant is Erktantol® NR (Tanatex Chemicals BV), which is a nonionic fatty alcohol polyglycol ether. Likewise, U.S. Pat. No. 4,302, 301 to Tierman describes various other nonionic surfactants that can be employed in the manganizing solution, such as nonylphenoxypoly-(ethyleneoxy)ethanol (Igepal CO-630); isooctylphenoxy-polyethoxyethanol (Triton X-100), benzyletheroctylphenol-ethylene oxide condensate (Triton CF-10), and 3,6-dimethyl-4-octyne-3,6-diol (Surfynol 82).

Although the addition of surfactants may provide some benefits, significant problems nevertheless remain. For example, the capacitors may still exhibit a relatively large loss in capacitance when wet and a high leakage current. This problem is particularly evident when the valve metal powder used to form the anode has a high specific charge—i.e., about 70,000 microFarads*Volts per gram ("µF*V/g") or more. Such high "CV/g" powders are generally formed from particles having a small size and large surface area, which results in the formation of small pores between the particles that are difficult to impregnate with the manganese nitrate solution. The difficulty in impregnating such small pores leads to the formation of manganese dioxide particles that are large in size and irregularly shaped. These particles do not adhere well to the dielectric coating and are unable to achieve good surface coverage, which leads to poor electrical performance of the capacitor.

As such, a need currently exists for an improved electrolytic capacitor containing a manganese oxide solid electrolyte.

SUMMARY OF THE INVENTION

In accordance with one embodiment of the present invention, a solid electrolytic capacitor is disclosed that comprises an anode body formed from an electrically conductive powder, wherein the powder has a specific charge of about 70,000 µF*V/g or more. A dielectric overlies the anode body. Further, a solid electrolyte overlies the dielectric, wherein the solid electrolyte includes a manganese oxide film that coats at least a portion of the dielectric in a substantially uniform manner.

In accordance with another embodiment of the present invention, a method for forming a solid electrolytic capacitor is disclosed. The method comprises anodically oxidizing an anode body to form a dielectric coating, wherein the anode body is formed from a powder. The dielectric-coated anode body is contacted with a manganese oxide precursor solution that contains a dispersant. In one embodiment, the dispersant includes an organic compound having a hydrophilic moiety and a hydrophobic moiety, which is an aromatic or heteroatomic ring system having from 6 to 14 carbon atoms. In another embodiment, the ratio of the surface tension of water (at 20° C.) to the surface tension of the dispersant (at a concentration of 1 wt. % in water and at 20° C.) is from about 0.8 to about 1.2. The precursor is pyrolytically converted to a manganese oxide solid electrolyte.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which:

FIGS. 2-4 are FESEM photographs of the samples of Example 1, wherein FIG. 2 is a photograph of Sample 1, FIG. 3 is a photograph of Sample 2, and FIG. 4 is a photograph of Sample 3;

FIGS. 5-7 are FESEM photographs of the samples of Example 2, wherein FIG. 5 is a photograph of Sample 1, FIG. 6 is a photograph of Sample 2, and FIG. 7 is a photograph of Sample 3;

FIGS. 8-10 are FESEM photographs of the samples of Example 3, wherein FIG. 8 is a photograph of Sample 1, FIG. 9 is a photograph of Sample 2, and FIG. 10 is a photograph of Sample 3;

FIGS. 11-12 are FESEM photographs of the samples of Example 4, wherein FIG. 11 is a photograph of Sample 1 and FIG. 12 is a photograph of Sample 2.

Figure 1:
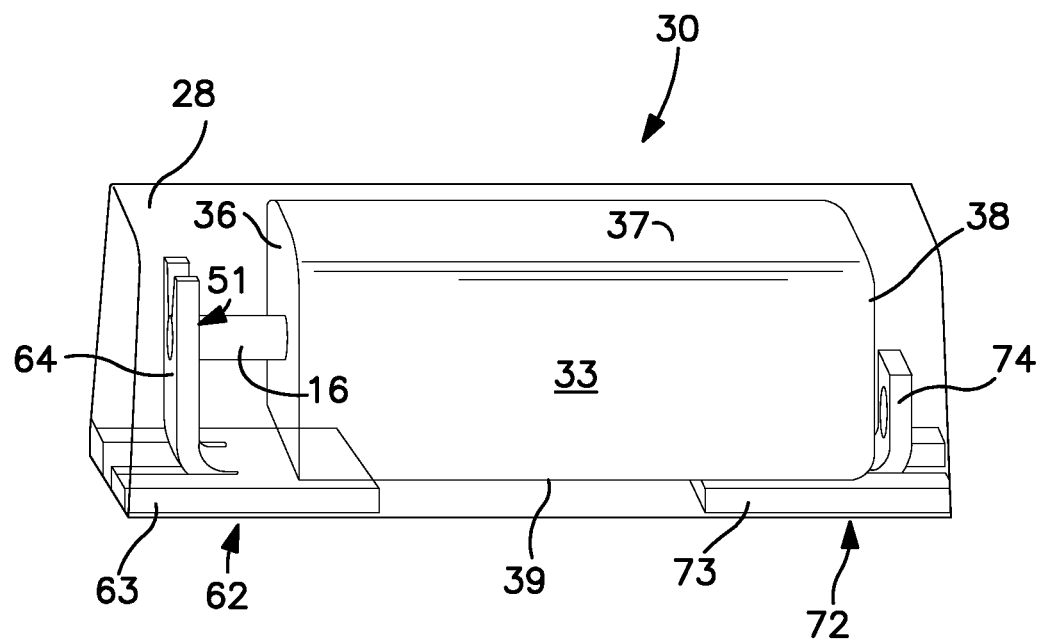
FIG. 1 is a schematic illustration of one embodiment of a capacitor that may be formed in accordance with the present invention.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a solid electrolytic capacitor that contains an anode body formed from an electrically conductive powder and a dielectric coating located over and/or within the anode body. The powder may have a high specific charge and in turn a relative dense packing configuration. Despite being formed from such a powder, the present inventors have discovered that a manganese precursor solution (e.g., manganese nitrate) can be readily impregnated into the pores of the anode. This is accomplished, in part, through the use of a dispersant in the precursor solution that helps minimize the likelihood that the manganese oxide precursor will form droplets upon contacting the surface of the dielectric. Instead, the precursor solution can be better dispersed so that the resulting manganese oxide has a "film-like" configuration and coats at least a portion of the anode in a substantially uniform manner. This improves the quality of the resulting oxide as well as its surface coverage, and thereby enhances the electrical performance of the capacitor. Various embodiments of the invention will now be described in more detail.

I. Anode

As indicated above, the anode may be formed from a powder having a high specific charge. That is, the powder may have a specific charge of about 70,000 microFarads*Volts per gram ("μF*V/g") or more, in some embodiments about 80,000 μF*V/g or more, in some embodiments about 100,000 μF*V/g or more, and in some embodiments, from about 120,000 to about 250,000 μF*V/g. Of course, although powders of a high specific charge are normally desired, it is not necessarily a requirement. In certain embodiments, for example, powders having a specific charge of less than about 70,000 microFarads*Volts per gram ("μF*V/g"), in some embodiments about 2,000 μF*V/g to about 65,000 μF*V/g, and in some embodiments, from about 5,000 to about 50,000 μF*V/g.

The powder may contain individual particles and/or agglomerates of such particles. Compounds for forming the powder include a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of $1:1.0\pm1.0$, in some embodiments $1:1.0\pm0.3$, in some embodiments $1:1.0\pm0.1$, and in some embodiments, $1:1.0\pm0.05$. For example, the niobium oxide may be $NbO_{0.7}$, $NbO_{1.0}$, $NbO_{1.1}$, and $NbO_2$. Examples of such valve metal oxides are described in U.S. Pat. Nos. 6,322,912 to Fife; 6,391,275 to Fife et al.; 6,416,730 to Fife et al.; 6,527,937 to Fife; 6,576,099 to Kimmel, et al.; 6,592,740 to Fife, et al.; and 6,639,787 to Kimmel, et al.; and 7,220,397 to Kimmel, al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

The apparent density (or Scott density) of the powder may vary as desired, but typically ranges from about 1 to about 8 grams per cubic centimeter (g/cm$^3$), in some embodiments from about 2 to about 7 g/cm$^3$, and in some embodiments, from about 3 to about 6 g/cm$^3$. To achieve the desired level of packing and apparent density, the size and shape of the particles (or agglomerates) may be carefully controlled. For example, the shape of the particles may be generally spherical, nodular, etc. The particles may have an average size of from about 0.1 to about 20 micrometers, in some embodiments from about 0.5 to about 15 micrometers, and in some embodiments, from about 1 to about 10 micrometers.

The powder may be formed using techniques known to those skilled in the art. A precursor tantalum powder, for instance, may be formed by reducing a tantalum salt (e.g., potassium fluotantalate ($K_2TaF_7$), sodium fluotantalate ($Na_2TaF_7$), tantalum pentachloride ($TaCF_5$), etc.) with a reducing agent (e.g., hydrogen, sodium, potassium, magnesium, calcium, etc.). Such powders may be agglomerated in a variety of ways, such as through one or multiple heat treatment steps at a temperature of from about 700° C. to about 1400° C., in some embodiments from about 750° C. to about 1200° C., and in some embodiments, from about 800° C. to about 1100° C. Heat treatment may occur in an inert or reducing atmosphere. For example, heat treatment may occur in an atmosphere containing hydrogen or a hydrogen-releasing compound (e.g., ammonium chloride, calcium hydride, magnesium hydride, etc.) to partially sinter the powder and decrease the content of impurities (e.g., fluorine). If desired, agglomeration may also be performed in the presence of a getter material, such as magnesium. After thermal treatment, the highly reactive coarse agglomerates may be passivated by gradual admission of air. Other suitable agglomeration techniques are also described in U.S. Pat. Nos. 6,576,038 to Rao; 6,238,456 to Wolf, et al.; 5,954,856 to Pathare, et al.; 5,082,491 to Rerat; 4,555,268 to Getz; 4,483,819 to Albrecht, et al.; 4,441,927 to Getz, et al.; and 4,017,302 to Bates, et al., which are incorporated herein in their entirety by reference thereto for all purposes.

The desired size and/or shape of the particles may be achieved by controlling various processing parameters as is known in the art, such as the parameters relating to powder formation (e.g., reduction process) and/or agglomeration (e.g., temperature, atmosphere, etc.). Milling techniques may also be employed to grind a precursor powder to the desired size. Any of a variety of milling techniques may be utilized to achieve the desired particle characteristics. For example, the powder may initially be dispersed in a fluid medium (e.g., ethanol, methanol, fluorinated fluid, etc.) to form a slurry. The slurry may then be combined with a grinding media (e.g., metal balls, such as tantalum) in a mill. The number of grinding media may generally vary depending on the size of the mill, such as from about 100 to about 2000, and in some embodiments from about 600 to about 1000. The starting powder, the fluid medium, and grinding media may be combined in any proportion. For example, the ratio of the starting powder to the grinding media may be from about 1:5 to about 1:50. Likewise, the ratio of the volume of the fluid medium to the combined volume of the starting powder may be from about 0.5:1 to about 3:1, in some embodiments from about 0.5:1 to about 2:1, and in some embodiments, from about 0.5:1 to about 1:1. Some examples of mills that may be used in the present invention are described in U.S. Pat. Nos. 5,522,558; 5,232,169; 6,126,097; and 6,145,765, which are incorporated herein in their entirety by reference thereto for all purposes. Milling may occur for any predetermined amount of time needed to achieve the target size. For example, the milling time may range from about 30 minutes to about 40 hours, in some embodiments, from about 1 hour to about 20 hours, and in some embodiments, from about 5 hours to about 15 hours. Milling may be conducted at any desired temperature, including at room temperature or an elevated temperature. After milling, the fluid medium may be separated or removed from the powder, such as by air-drying, heating, filtering, evaporating, etc.

Various other conventional treatments may also be employed in the present invention to improve the properties of the powder. For example, in certain embodiments, the particles may be treated with sinter retardants in the presence of a dopant, such as aqueous acids (e.g., phosphoric acid). The amount of the dopant added depends in part on the surface area of the powder, but is typically present in an amount of no more than about 200 parts per million ("ppm"). The dopant may be added prior to, during, and/or subsequent to any heat treatment step(s).

The particles may also be subjected to one or more deoxidation treatments to improve ductility and reduce leakage current in the anodes. For example, the particles may be exposed to a getter material (e.g., magnesium), such as described in U.S. Pat. No. 4,960,471, which is incorporated herein in its entirety by reference thereto for all purposes. The getter material may be present in an amount of from about 2% to about 6% by weight. The temperature at which deoxidation occurs may vary, but typically ranges from about 700° C. to about 1600° C., in some embodiments from about 750° C. to about 1200° C., and in some embodiments, from about 800° C. to about 1000° C. The total time of deoxidation treatment(s) may range from about 20 minutes to about 3 hours. Deoxidation also preferably occurs in an inert atmosphere (e.g., argon). Upon completion of the deoxidation treatment(s), the magnesium or other getter material typically vaporizes and forms a precipitate on the cold wall of the furnace. To ensure removal of the getter material, however, the fine agglomerates and/or coarse agglomerates may be subjected to one or more acid leaching steps, such as with nitric acid, hydrofluoric acid, etc.

To facilitate the construction of the anode, certain components may also be included in the powder. For example, the powder may be optionally mixed with a binder and/or lubricant to ensure that the particles adequately adhere to each other when pressed to form the anode body. Suitable binders may include, for instance, poly(vinyl butyral); poly(vinyl acetate); poly(vinyl alcohol); poly(vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and/or lubricants are not necessarily required in the present invention.

The resulting powder may be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode body subsequent to pressing and/or sintering of the anode body.

After compaction, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum or an inert atmosphere. Upon sintering, the pellet shrinks due to the growth of bonds between the particles. The pressed density of the pellet after sintering may vary, but is typically from about 2.0 to about 7.0 grams per cubic centimeter, in some embodiments from about 2.5 to about 6.5, and in some embodiments, from about 3.0 to about 6.0 grams per cubic centimeter. The pressed density is determined by dividing the amount of material by the volume of the pressed pellet.

In addition to the techniques described above, any other technique for constructing the anode may also be utilized in accordance with the present invention, such as described in U.S. Pat. Nos. 4,085,435 to Galvagni; 4,945,452 to Sturmer, et al.; 5,198,968 to Galvagni; 5,357,399 to Salisbury; 5,394,295 to Galvagni, et al.; 5,495,386 to Kulkarni; and 6,322,912 to Fife, which are incorporated herein in their entirety by reference thereto for all purposes.

Although not required, the thickness of the anode may be selected to improve the electrical performance of the capacitor. For example, the thickness of the anode may be about 4 millimeters or less, in some embodiments, from about 0.05 to about 2 millimeters, and in some embodiments, from about 0.1 to about 1 millimeter. The shape of the anode may also be selected to improve the electrical properties of the resulting capacitor. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. Nos. 6,191,936 to Webber, et al.; 5,949,639 to Maeda, et al.; and 3,345,545 to Bourgault et al., as well as U.S. Patent Application Publication No. 2005/0270725 to Hahn, et al., all of which are incorporated herein in their entirety by reference thereto for all purposes.

II. Dielectric

Once constructed, the anode may be anodized so that a dielectric layer is formed over and/or within the anode. Anodization is an electrochemical process by which the anode is oxidized to form a material having a relatively high dielectric constant. For example, a tantalum anode may be anodized to tantalum pentoxide ($Ta_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

III. Solid Electrolyte

As indicated above, the capacitor of the present invention contains a manganese oxide (e.g., $MnO_2$) as a solid electrolyte. The manganese oxide is formed through pyrolytic decomposition of a precursor (e.g., manganese nitrate (Mn $(NO_3)_2$)), such as described in U.S. Pat. No. 4,945,452 to Sturmer, et al., which is incorporated herein in its entirety by reference thereto for all purposes. For example, a dielectric-coated anode body may be contacted with a solution (e.g., dipped, immersed, sprayed, etc.) that contains the precursor and thereafter heated for conversion into the oxide. If desired, multiple application steps may be employed to achieve the desired thickness. In one embodiment, for example, the anode body is dipped into a first solution of a manganese oxide precursor, heated, and then into a second solution of manganese oxide precursor and heated. This process may be repeated until the desired thickness is reached.

While the constituents of the manganese oxide precursor solution(s) may vary in each application step, if multiple steps are employed, it is generally desired that at least one of the solutions contains a dispersant that is an organic compound containing a hydrophilic moiety and a hydrophobic moiety. The hydrophilic moiety may, for example, include a sulfonate, phosphonate, carboxylate, thiol, sulfonate ester, phosphite, phosphonite, phosphinite, phosphate, sulfate, phosphate ester, sulfoxide, sulfone, amino, etc., as well as mixtures and/or salts thereof. Unlike conventional surfactants, the hydrophobic moiety of the dispersant is generally too small to substantially reduce the surface tension of the solution. For example, the hydrophobic moiety may be an aromatic or heteroatomic ring system having from 6 to 14 carbon atoms (substituted or unsubstituted), such as benzene, naphthalene, anthracene, toluene, xylene, pyridine, quinoline, isoquinoline, pyrazine, acridine, pyrimidine, pyridazine, etc.

Because the dispersant does not substantially lower the surface tension of the solution, it may have a surface tension that is approximately the same as water. For instance, the ratio of the surface tension of water (at 20° C.) to the surface tension of the dispersant (at a concentration of 1 wt. % in water and at 20° C.) may be from about 0.5 to about 2.0, in some embodiments from about 0.8 to about 1.2, and in some embodiments, from about 0.9 to about 1.1. In certain embodiments, the surface tension of the dispersant (at a concentration of 1 wt. % in water and at 20° C.) is from about 50 to about 95 dynes per centimeter, in some embodiments from about 55 to about 80 dynes per centimeter, and in some embodiments, from about 58 to about 68 dynes per centimeter. The surface tension of water is about 70 dynes per centimeter. To the contrary, conventional surfactants typically have a much lower surface tension. For example, Triton X-100 and Erkantol® NR are believed to both have a surface tension of approximately 30 dynes per centimeter (at a concentration of 1 wt. % in water at 20° C.). As is well known in the art, surface tension can be measured using commercially available force tensiometers or optical tensiometers (also known as contact angle meter or goniometer) in accordance with ISO 304 (1985), Cor 1:1998) and/or ASTM D 1331-89 (Method A).

In one particular embodiment, for example, the dispersant may contain an organic compound having the following structure, or a salt thereof:

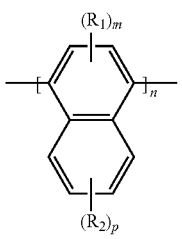

wherein, $R_1$ is an alkyl group having from 1 to 6 carbon atoms;

$R_2$ is a hydrophilic moiety, such as sulfonate, phosphonate, carboxylate, thiol, sulfonate ester, phosphite, phosphonite, phosphinite, phosphate, sulfate, phosphate ester, sulfoxide, sulfone, amino, etc., and combinations thereof;

m is from 0 to 8, in some embodiments from 0 to 4, and in one embodiment, 0;

p is from 1 to 8, in some embodiments from 1 to 4, and in one embodiment, 1; and n is from 1 to 100, and in some embodiments, from 2 to 30. It should be understood that the $R_1$ and $R_2$ groups may be bonded to one or more of the carbon atoms of the ring system. Also, if desired, the compound may be in the form of a salt in which the cation is an alkali metal (e.g., sodium, potassium, ammonium, etc.), alkaline metal (e.g., calcium), ammonia ($NH_4^+$), etc. Comparable compounds with a benzene nucleus also can be used.

The molecular weight of the dispersant may generally vary as desired, but is typically about 10,000 grams per mole or less, in some embodiments about 6,000 grams per mole or less, and in some embodiments, from about 2,000 to about 5,000 grams per mole. Suitable starting materials for forming such dispersants are well known in the art and may include, for instance, naphthalene-α-sulfonic acid (dihydrate), naphthalene-β-sulfonic acid (monohydrate), 2-methylnapthalene-6-sulfonic acid, etc. One particularly suitable dispersant that may be employed in the present invention is an alkali or alkaline metal salt of a condensed naphthalene sulfonic acid. Such compounds may be prepared as described in U.S. Pat. No. 3,067,243, the entirety of which is incorporated herein for all relevant purposes. For instance, the compound may be prepared by sulfonating naphthalene with sulfuric acid, condensing the sulfonated naphthalene with formaldehyde, and then neutralizing the condensate so obtained with a base (e.g., sodium hydroxide, potassium hydroxide, calcium hydroxide, etc.). The resulting salt of condensed naphthalene sulfonic acid may have the following structure:

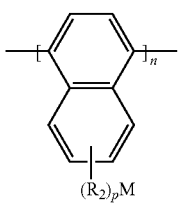

wherein, $R_2$ is $SO_3$;

p is an integer from 1 to 8;

n is from 1 to 100; and

M is sodium, potassium, or calcium. Particularly suitable sodium, potassium, or calcium salts of condensed naphthalene sulfonate are commercially available under the trade name Daxad® 11 (available from Geo Specialty Chemicals), Spolostan 4P or 7P (available from Enaspol, a.s., Czech Republic), Proxmat PL-C 753 FP (available from Synthron), and Darvan® 1 (available from R.T. Vanderbilt Co., Inc.

Rather than impacting surface tension, the dispersant of the present invention helps "disperse" droplets that initially form when the manganese oxide precursor contacts the surface of the dielectric. Because these droplets become dispersed, the manganese oxide precursor is able to penetrate into very small spaces between the anode particles to increase the degree of surface coverage. Furthermore, the reduction in droplet formation also allows the coating to assume a film-like configuration that substantially covers a certain area of the dielectric. This improves the quality of the resulting oxide as well as its surface coverage.

In addition, the dispersant may also lead to the formation of a colloidal suspension of nano-sized manganese oxide precursor particles. Without intending to be limited by theory, it is believed that such nano-sized particles can result in the formation of smaller crystals on the surface of the anode during the initial application stages of the manganese oxide coating. Such smaller crystals can, in turn, enhance the available surface area for subsequent manganese oxide applications. This may ultimately result in a coating that is substantially uniform with excellent surface coverage.

The nano-sized particles may, for instance, have an average diameter of about 100 nanometers, about 50 nanometers or less, in some embodiments from about 0.1 to about 30 nanometers, in some embodiments from about 0.2 to about 10 nanometers, and in some embodiments, from about 0.4 to about 2 nanometers. The term "diameter" generally refers to the "hydrodynamic equivalent diameter" of a particle as determined using known techniques, such as photon correlation spectroscopy, dynamic light scattering, quasi-elastic light scattering, etc. These methods are generally based on the correlation of particle size with diffusion properties of particles obtained from Brownian motion measurements. Brownian motion is the random movement of the particles due to bombardment by the solvent molecules that surround the particles. The larger the particle, the more slowly the Brownian motion will be. Velocity is defined by the translational diffusion coefficient. The measured particle size value thus relates to how the particle moves within a liquid and is termed the "hydrodynamic diameter." Various particle size analyzers may be employed to measure the diameter in this manner. One particular example is a Corouan VASCO 3 Particle Size Analyzer. Although not necessarily required, the nano-sized particles may also have a narrow particle size distribution, which may further improve the uniformity of the resulting manganese oxide coating. For instance, 50% or more, in some embodiments 70% or more, and in some embodiments, 90% or more of the particles may have an average size within the ranges noted above. The number of particles having a certain size may be determined using the techniques noted above, wherein the percent volume can be correlated to the number of particles having a certain absorbance unit ("au").

To achieve the desired improvement in the impregnation of the manganese oxide precursor without adversely impacting other characteristics of the capacitor, it is generally desired that the concentration of the dispersant is selectively controlled within a certain range. For example, the solution into which the anode body is first dipped may contain the dispersant in an amount of from about 0.001 wt. % to about 5 wt. %, in some embodiments from about 0.005 wt. % to about 2 wt. %, and in some embodiments, from about 0.01 wt. % to about 1 wt. %. The precursor(s) (e.g., manganese nitrate) may likewise constitute from about 1 wt. % to about 55 wt. % in some embodiments from about 2 wt. % to about 15 wt. %, and in some embodiments, from about 5 wt % to about 10 wt. %, of the solution.

A carrier, such as water, is also employed in the solution. Aqueous solutions of the present invention may, for instance, contain water in an amount of from about 30 wt. % to about 95 wt. %, in some embodiments from about 40 wt. % to about 99 wt. % and in some embodiments, from about 50 wt. % to about 95 wt. %. In addition to the components noted above, the manganese nitrate solution may also contain other additives that improve the formation of the resulting oxide. In one embodiment, for example, an alcohol may be used to enhance the wettability of the dielectric with the solution. Suitable alcohols may include, for instance, methanol, ethanol, n-propanol, isopropanol, butanol, etc., as well as mixtures thereof. The concentration of the alcohol(s), when employed, may be from about 0.1 wt. % to about 50 wt. %, and in some embodiments, from about 0.5 wt. % to about 2 wt. %.

It should be understood that the actual amounts of the components in the solution may vary depending upon such factors as the particle size and distribution of particles in the anode, the temperature at which decomposition is performed, the identity of the dispersant, the identity of the carrier, the identity of the alcohol, etc. Furthermore, it should also be understood that differing concentrations may be employed in different application steps. For example, a first set of one or more dipping steps may be employed in which the manganese oxide precursor is present at a first concentration. Thereafter, a second set of one or more dipping steps may be employed in which the manganese oxide precursor is present at a second concentration. In some cases, the second concentration may be higher than the first concentration.

The amount of time in which the anode body is in contact with the manganese oxide precursor solution may vary as desired. For example, the anode body may be dipped into such a solution for a period of time ranging from about 10 seconds to about 10 minutes. The time may be the same or different for each individual dipping step. The dielectric-coated anode body may be at room temperature or pre-dried prior to contact with the precursor solution.

Regardless, once contacted with the precursor solution for the desired amount of time, the part is heated to a temperature sufficient to pyrolytically convert the precursor (e.g., manganese nitrate) to an oxide. Heating may occur, for instance, in a furnace at a temperature of from about 150° C. to about 300° C., in some embodiments from about 180° C. to about 290° C., and in some embodiments, from about 190° C. to about 260° C. Heating may be conducted in a moist or dry atmosphere. The time for the conversion depends on the furnace temperature, heat transfer rate and atmosphere, but generally is from about 3 to about 5 minutes. After pyrolysis, the leakage current may sometimes be high due to damage suffered by the dielectric film during the deposition of the manganese dioxide. To reduce this leakage, the capacitor may be reformed in an anodization bath as is known in the art. For example, the capacitor may be dipped into an electrolyte such as described above and then subjected to a DC current.

IV. Other Components of the Capacitor

If desired, the capacitor may also contain other layers as is known in the art. For example, a protective coating may optionally be formed between the dielectric and solid electrolyte, such as one made of a relatively insulative resinous material (natural or synthetic). Such materials may have a specific resistivity of greater than about 10 $\Omega$/cm, in some embodiments greater than about 100, in some embodiments greater than about 1,000 $\Omega$/cm, in some embodiments greater than about $1\times10^5$ $\Omega$/cm, and in some embodiments, greater than about $1\times10^{10}$ $\Omega$/cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

If desired, the part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

The capacitor may also be provided with terminations, particularly when employed in surface mounting applications. For example, the capacitor may contain an anode termination to which the anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

Referring to FIG. 1, one embodiment of an electrolytic capacitor 30 is shown that includes an anode termination 62 and a cathode termination 72 in electrical connection with a capacitor element 33. The capacitor element 33 has an upper surface 37, lower surface 39, front surface 36, and rear surface 38. Although it may be in electrical contact with any of the surfaces of the capacitor element 33, the cathode termination 72 in the illustrated embodiment is in electrical contact with the lower surface 39 and rear surface 38. More specifically, the cathode termination 72 contains a first component 73 positioned substantially perpendicular to a second component 74. The first component 73 is in electrical contact and generally parallel with the lower surface 39 of the capacitor element 33. The second component 74 is in electrical contact and generally parallel to the rear surface 38 of the capacitor element 33. Although depicted as being integral, it should be understood that these portions may alternatively be separate pieces that are connected together, either directly or via an additional conductive element (e.g., metal).

The anode termination 62 likewise contains a first component 63 positioned substantially perpendicular to a second component 64. The first component 63 is in electrical contact and generally parallel with the lower surface 39 of the capacitor element 33. The second component 64 contains a region 51 that carries an anode lead 16. In the illustrated embodiment, the region 51 possesses a "U-shape" for further enhancing surface contact and mechanical stability of the lead 16.

The terminations may be connected to the capacitor element using any technique known in the art. In one embodiment, for example, a lead frame may be provided that defines the cathode termination 72 and anode termination 62. To attach the electrolytic capacitor element 33 to the lead frame, a conductive adhesive may initially be applied to a surface of the cathode termination 72. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al., which is incorporated herein in its entirety by reference thereto for all purposes. Any of a variety of techniques may be used to apply the conductive adhesive to the cathode termination 72. Printing techniques, for instance, may be employed due to their practical and cost-saving benefits.

A variety of methods may generally be employed to attach the terminations to the capacitor. In one embodiment, for example, the second component 64 of the anode termination 62 and the second component 74 of the cathode termination 72 are initially bent upward to the position shown in FIG. 1. Thereafter, the capacitor element 33 is positioned on the cathode termination 72 so that its lower surface 39 contacts the adhesive and the anode lead 16 is received by the upper U-shaped region 51. If desired, an insulating material (not shown), such as a plastic pad or tape, may be positioned between the lower surface 39 of the capacitor element 33 and the first component 63 of the anode termination 62 to electrically isolate the anode and cathode terminations.

The anode lead 16 is then electrically connected to the region 51 using any technique known in the art, such as mechanical welding, laser welding, conductive adhesives, etc. For example, the anode lead 16 may be welded to the anode termination 62 using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode lead 16 to the anode termination 62, the conductive adhesive may then be cured. For example, a heat press may be used to apply heat and pressure to ensure that the electrolytic capacitor element 33 is adequately adhered to the cathode termination 72 by the adhesive.

Once the capacitor element is attached, the lead frame is enclosed within a resin casing, which may then be filled with silica or any other known encapsulating material. The width and length of the case may vary depending on the intended application. Suitable casings may include, for instance, "A", "B", "C", "D", "E", "F", "G", "H", "J", "K", "L", "M", "N", "P", "R", "S", "T", "V", "W", "Y", "X", or "Z" cases (AVX Corporation). Regardless of the case size employed, the capacitor element is encapsulated so that at least a portion of the anode and cathode terminations are exposed for mounting onto a circuit board. As shown in FIG. 1, for instance, the capacitor element 33 is encapsulated in a case 28 so that a portion of the anode termination 62 and a portion of the cathode termination 72 are exposed.

Regardless of the particular manner in which it is formed, the resulting capacitor may possess a high volumetric efficiency and also exhibit excellent electrical properties. Even at such high volumetric efficiencies, the equivalent series resistance ("ESR") may still be less than about 200 milliohms, in some embodiments less than about 100 milliohms, and in some embodiments, from about 1 to about 50 milliohms, as measured with a 2.2 volt DC bias and a 0.5 volt peak to peak sinusoidal signal, free of harmonics, at a frequency of 100 kHz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 μA/μF*V, in some embodiments less than about 0.5 μA/μF*V, and in some embodiments, less than about 0.1 μA/μF*V, where μA is microamps and μF*V is the product of the capacitance and the rated voltage.

In addition, the capacitor can also exhibit a relatively high percentage of its wet capacitance, which enables it to have only a small capacitance loss and/or fluctuation in the presence of atmosphere humidity. This performance characteristic is quantified by the "dry to wet capacitance percentage", which is determined by the equation:

$$\text{Dry to Wet Capacitance} = (1-([\text{Wet}-\text{Dry}]/\text{Wet})) \times 100$$

The capacitor of the present invention, for instance, may exhibit a dry to wet capacitance percentage of about 80% or more, in some embodiments about 85% or more, in some embodiments about 90% or more, and in some embodiments, from about 92% to 100%.

The capacitance, ESR and normalized leakage current values may even be maintained after aging for a substantial amount of time. For example, the values may be maintained for about 100 hours or more, in some embodiments from about 300 hours to about 2500 hours, and in some embodiments, from about 400 hours to about 1500 hours (e.g., 500 hours, 600 hours, 700 hours, 800 hours, 900 hours, 1000 hours, 1100 hours, or 1200 hours) at temperatures ranging from about 20° C. to about 250° C., and, in some embodiments from about 25° C. to about 100° C. (e.g., 20° C. or 25° C.).

The present invention may be better understood with reference to the following examples.

Test Procedures

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency was 100 kHz and the temperature was 23° C.±2° C.

Dry and Wet Capacitance

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C., The "dry capacitance" refers to the capacitance of the part after application of the manganese oxide, graphite, and silver layers, while the "wet capacitance" refers to the capacitance of the part after formation of the dielectric, measured in 17% sulfuric acid in reference to 1 mF tantalum cathode.

Leakage Current:

Leakage current ("DCL") was measured using a leakage test set that measures leakage current at a temperature of 25° C. and at the rated voltage after a minimum of 30 seconds.

Life Testing:

For life testing, twenty five (25) samples of the capacitor were soldered onto a testing plate and put into an oven at the rated voltage of the part and an elevated temperature (e.g., 85° C.) for 2000 hours.

EXAMPLE 1

150,000 μF*V/g Tantalum Powder (Capacitors 100 μF/4V)

Initially, 3×100,000 capacitor element samples were formed from tantalum anodes having a size of 1.65 mm (length)×1.15 mm (width)×0.85 mm (thickness). Each anode was embedded with a tantalum wire, pressed to a density of 5.85 g/cm$^3$, and sintered at 1270° C. for 20 minutes. The tantalum anode was anodized in an orthophosphoric acid/water solution having a conductivity of 8.6 mS/cm and temperature of 85° C. with a forming voltage of 11 volts. The samples were initially dipped into an aqueous solution of manganese(II) nitrate (1150 kg/m$^3$) for 150 seconds and then decomposed at 250° C. to achieve the MnO$_2$ electrolyte. This step was repeated eight times.

Thereafter, a first set of samples was dipped into an aqueous solution of manganese(II) nitrate (1300 kg/m$^3$) and 3 g/dm$^3$ of a dispersant (Spolostan 4P, a sodium salt of naphthalene sulfonic acid, polymerized with formaldehyde and produced in Enaspol, Czech Republic), and then decomposed at 250° C. to achieve the MnO$_2$ cathode. The dispersant had a surface tension of about 62 dynes per centimeter (at a concentration of 1 wt. % in water at 20° C.). These steps were repeated six times. A second set of the samples was dipped into an aqueous solution of manganese(II) nitrate (1300 kg/m$^3$) and 3 g/dm$^3$ of Erkantol NR (Tanatex Chemicals BV) for 150 seconds then dried at 250° C. to achieve an MnO$_2$ cathode. These steps were repeated six times. Finally, a third set of samples was dipped into an aqueous solution of only manganese(II) nitrate (1300 kg/m$^3$) for 150 seconds and decomposed at 250° C. to achieve an MnO$_2$ cathode. This step was repeated six times. All of the samples were then dipped into high specific gravity manganese(II) nitrate sequentially into a graphite dispersion and in a silver dispersion and dried.

The median wet capacitance (for 300 samples) was 105 μF.

The finished capacitor elements were completed by conventional assembly technology and tested for electrical properties. The results are set forth below.

| | Median of Electrical Parameters (based on 100,000 parts) | | |
|---|---|---|---|
| Sample | DCL [μA] (soak time of 70 sec) | Dry Capacitance [μF] | Dry to Wet Capacitance [%] |
| 1 Spolostan 4P | 0.34 | 87.5 | 83.3 |
| 2 Erkantol NR | 0.92 | 88.2 | 84.0 |
| 3 Control | 1.28 | 71.3 | 67.9 |

| | Median of Electrical Parameters Before and after Life Testing (based on 25 parts) | | | |
|---|---|---|---|---|
| | DCL [μA] (soak time of 70 sec) | | Dry Capacitance [μF] | |
| Sample | Before | After | Before | After |
| 1 Spolostan 4P | 0.25 | 0.25 | 91.1 | 85.0 |
| 2 Erkantol NR | 0.64 | 0.59 | 96.4 | 81.1 |
| 3 Control | 1.23 | 1.19 | 72.1 | 67.2 |

Figure 2:
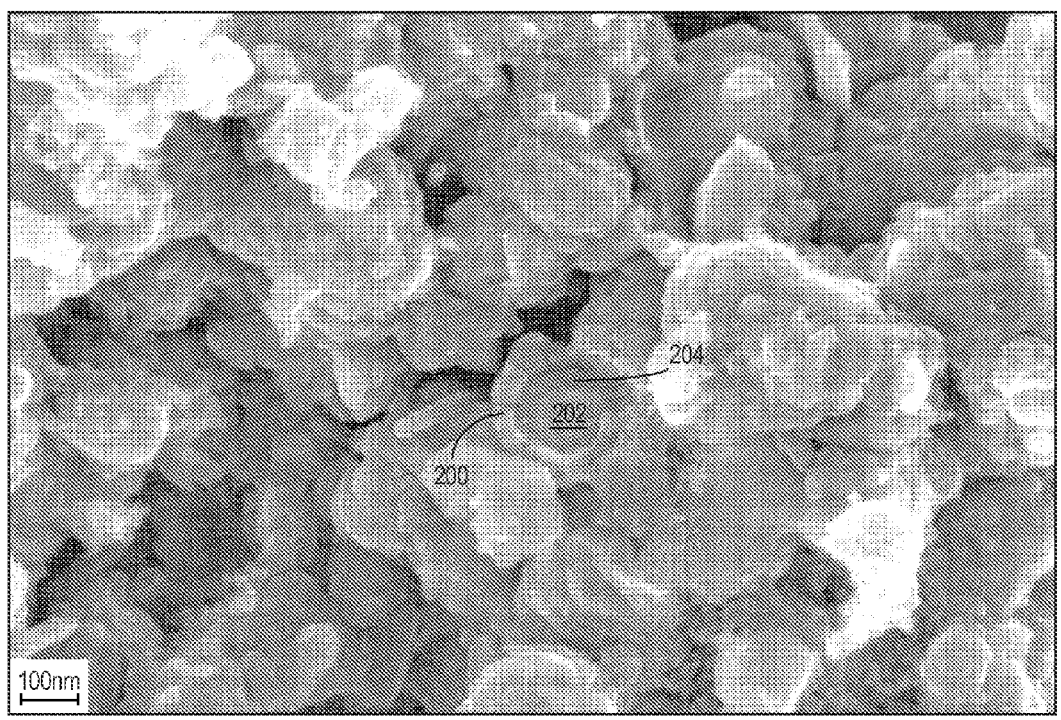
Figure 3:
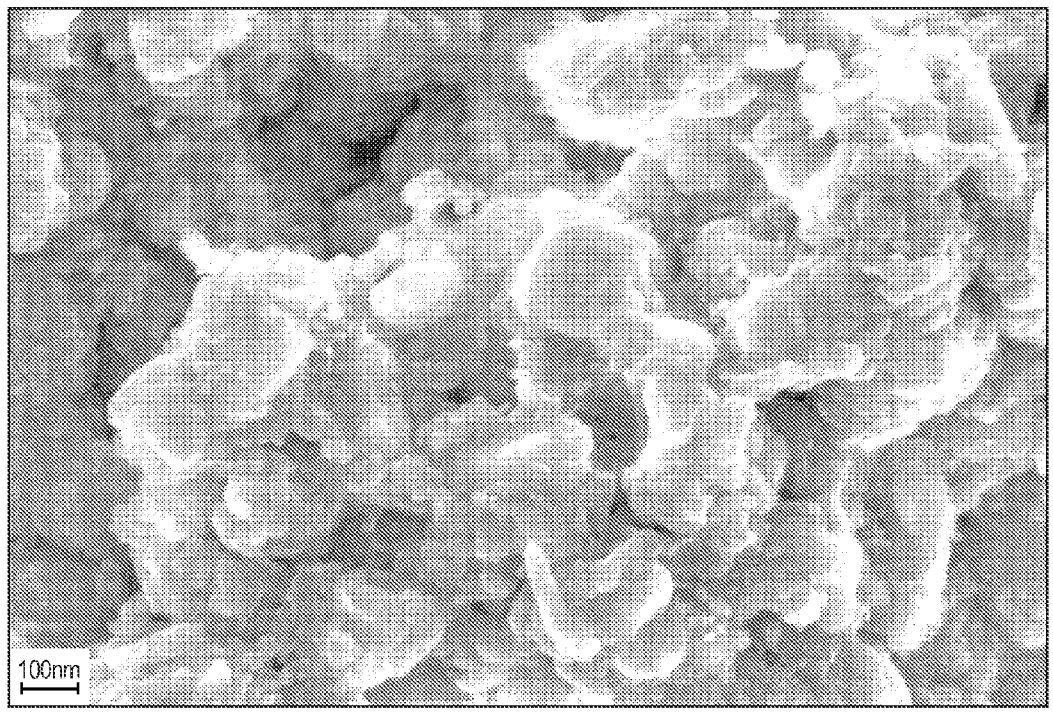
Figure 4:
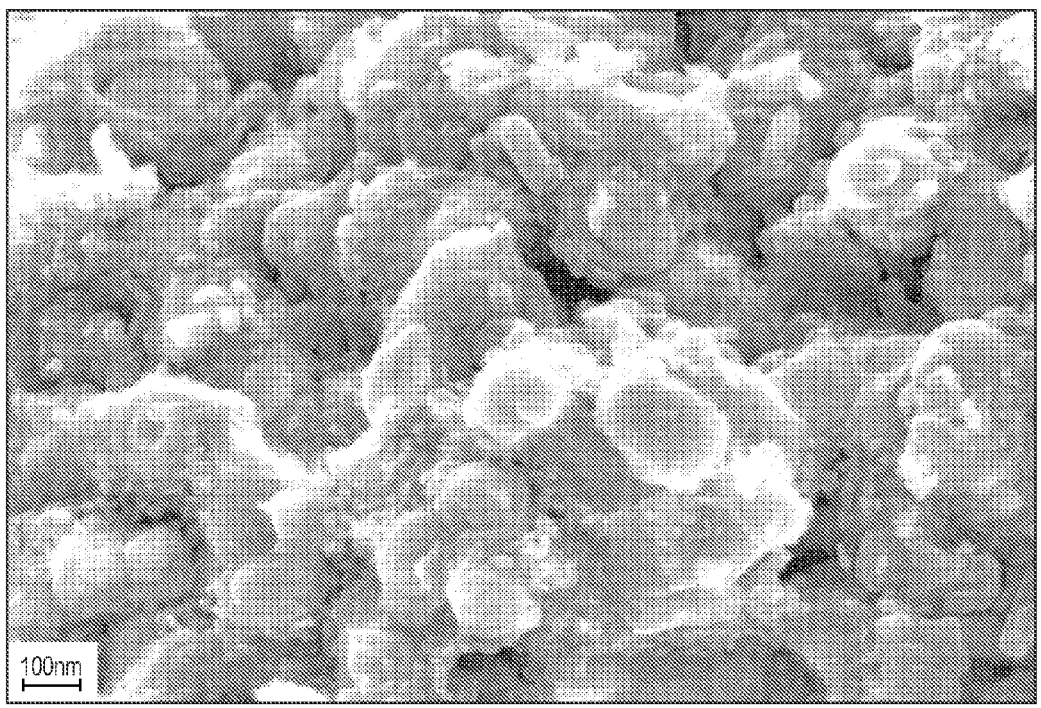

As indicated, the samples made from the dispersant of the present invention (Sample 1) exhibited very low leakage current and a high dry to wet capacitance percentage, even after life testing. FIGS. 2-4 also show FESEM photographs that were taken of the finished capacitors of Samples 1-3, respectively. As shown in FIG. 2, the sample made from Spolostan 4P contains manganese dioxide crystals 200 that uniformly coat the dielectric 204 formed on a tantalum particle 202. Furthermore, the manganese oxide crystals are relatively small and substantially homogenously distributed through the sample. In comparison, the samples shown in FIGS. 3-4 contain a substantial number of large, unevenly distributed manganese oxide crystals.

EXAMPLE 2

70,000 μF*V/g Tantalum Powder (Capacitors 220 μF/6.3V)

Initially, 2×100,000 capacitor element samples were formed from tantalum anodes having a size of 1.8 mm (length)×2.45 mm (width)×1.35 mm (thickness). Each anode was embedded with a tantalum wire, pressed to a density of 6.1 g/cm$^3$, and sintered at 1295° C. for 20 minutes. The tantalum anode was anodized in an orthophosphoric acid/water solution having a conductivity of 8.6 mS/cm and temperature of 85° C. with a forming voltage of 9 volts. The samples were dipped into a conventional aqueous solution of manganese(II) nitrate (1050 kg/m$^3$) for 150 seconds and then decomposed at 250° C. This step was repeated two times. Next, the samples were dipped into a conventional aqueous solution of manganese(II) nitrate (1150 kg/m$^3$) for 150 seconds and then decomposed at 250° C. This step was repeated eight times. Thereafter, a first set of samples was dipped into an aqueous solution of manganese(II) nitrate (1300 kg/m$^3$) and 3 g/dm$^3$ of Spolostan 4P and then decomposed at 250° C. This step was repeated eight times. A second set of the samples was dipped into an aqueous solution of manganese (II) nitrate (1300 kg/m$^3$) and 3 g/dm$^3$ of Erkantol NR for 150 seconds then decomposed at 250° C. This step was repeated eight times. Finally, a third set of samples was dipped into an aqueous solution of only manganese(II) nitrate (1300 kg/m$^3$) for 150 seconds and decomposed at 250° C. This step was repeated eight times. All of the samples were then dipped into high specific gravity manganese(II) nitrate sequentially into a graphite dispersion and in a silver dispersion and dried.

The median wet capacitance (300 samples) was 236 μF.

The finished capacitor elements were completed by conventional assembly technology and tested for electrical properties. The results are set forth below.

| | Median of Electrical Parameters (based on 100,000 parts) | | |
|---|---|---|---|
| Sample | DCL [μA] (soak time of 70 sec) | Dry Capacitance [μF] | Dry to Wet Capacitance [%] |
| 1 Spolostan 4P | 1.40 | 212.2 | 89.9 |
| 2 Erkantol NR | 1.88 | 209.0 | 88.6 |
| 3 Control | 1.92 | 196.3 | 83.2 |

| | Median of Electrical Parameters Before and after Life Testing (based on 25 parts) | | | |
|---|---|---|---|---|
| | DCL [μA] (soak time of 70 sec) | | Dry Capacitance [μF] | |
| Sample | Before | After | Before | After |
| 1 Spolostan 4P | 1.18 | 0.59 | 215.8 | 204.0 |
| 2 Erkantol NR | 1.71 | 1.60 | 214.0 | 200.5 |
| 3 Control | 1.86 | 1.80 | 193.2 | 189.5 |

Figure 5:
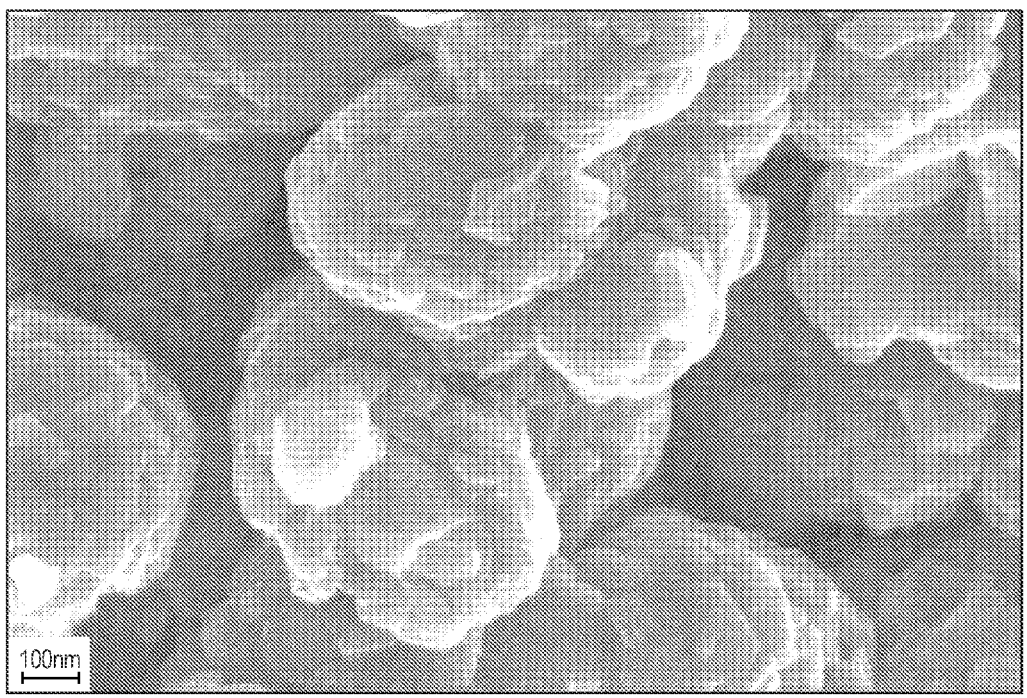
Figure 6:
Figure 7:
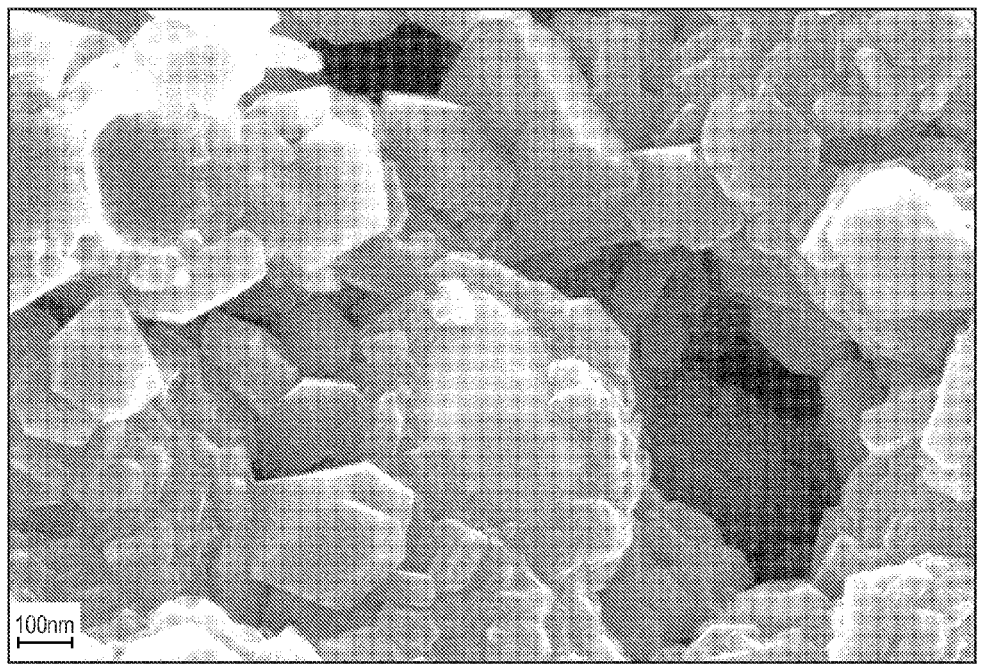

As indicated, the samples made from the dispersant of the present invention (Sample 1) exhibited very low leakage current and a high dry to wet capacitance percentage, even after life testing. FIGS. 5-7 also include FESEM photographs that were taken of the finished capacitors of Samples 1-3, respectively. As shown, the sample made from Spolostan 4P (FIG. 5) contains relatively small manganese oxide crystals that are substantially homogenously distributed through the sample. In comparison, the samples shown in FIGS. 6-7 contain a substantial number of large, unevenly distributed manganese oxide crystals.

EXAMPLE 3

80,000 μF*V/g Niobium Oxide Powder (Capacitors 220 μF/6.3V)

Initially, 3×20,000 capacitor element samples were formed from NbO anodes having a size of 3.5 mm (length)×2.7 mm (width)×1.65 mm (thickness). Each anode was embedded with a tantalum wire, pressed to a density of 3.1 g/cm$^3$, and sintered at 1460° C. for 20 minutes. The NbO anodes were anodized in an orthophosphoric acid/water solution having a conductivity of 8.6 mS/cm and temperature of 85° C. with a forming voltage of 15V. The samples were dipped into a conventional aqueous solution of manganese(II) nitrate (1150 kg/m$^3$) for 150 seconds and then decomposed at 200° C. This step was repeated six times. Thereafter, a first set of samples was dipped into an aqueous solution of manganese(II) nitrate (1300 kg/m$^3$) and 3 g/dm$^3$ of Spolostan 4P and then decomposed at 200° C. This step was repeated two times. A second set of the samples was dipped into an aqueous solution of manganese(II) nitrate (1300 kg/m$^3$) and 3 g/dm$^3$ of Erkantol NR for 150 seconds then decomposed at 200° C. This step was repeated two times. Finally, a third set of samples was dipped into an aqueous solution of only manganese(II) nitrate (1300 kg/m$^3$) for 150 seconds and decomposed at 200° C. This step was repeated two times. All of the samples were then dipped into high specific gravity manganese(II) nitrate sequentially into a graphite dispersion and in a silver dispersion and dried.

The median wet capacitance (for 60 samples) was 242 μF.

The finished capacitor elements were completed by conventional assembly technology and tested for electrical properties. The results are set forth below.

| | Median of Electrical Parameters (based on 20,000 parts) | | |
|---|---|---|---|
| Sample | DCL [μA] (soak time of 45 sec) | Dry Capacitance [μF] | Dry to Wet Capacitance [%] |
| 1 Spolostan 4P | 1.76 | 224.6 | 92.8 |
| 2 Erkantol NR | 2.35 | 214.4 | 88.6 |
| 3 Control | 2.36 | 212.5 | 87.8 |

| | Median of Electrical Parameters Before and after Life Testing (based on 25 parts) | | | |
|---|---|---|---|---|
| | DCL [μA] (soak time of 45 sec) | | Dry Capacitance [μF] | |
| Sample | Before | After | Before | After |
| 1 Spolostan 4P | 1.77 | 15.0 | 221.8 | 216.5 |
| 2 Erkantol NR | 2.29 | 17.2 | 217.3 | 214.9 |
| 3 Control | 2.31 | 20.1 | 216.0 | 209.2 |

Figure 8:
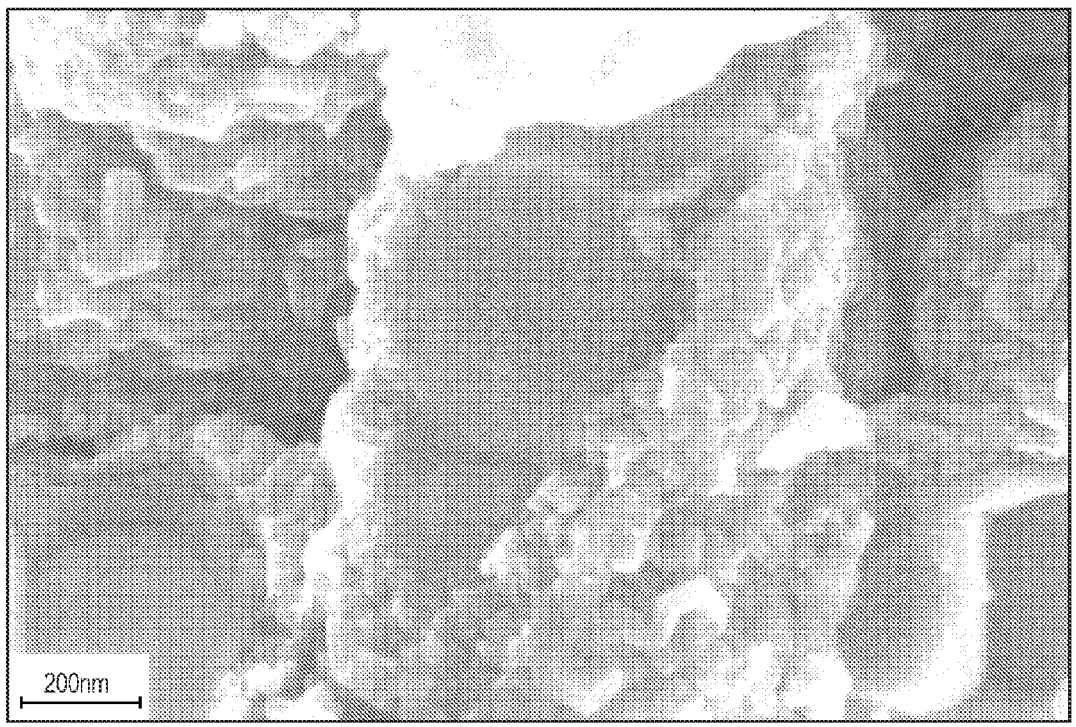
Figure 9:
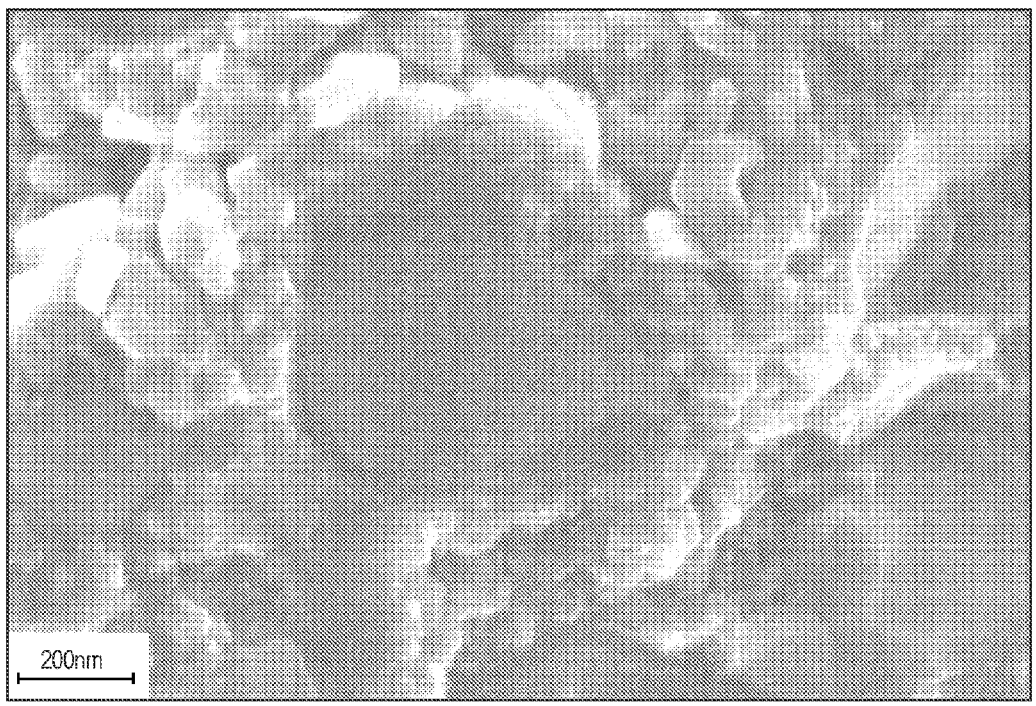
Figure 10:
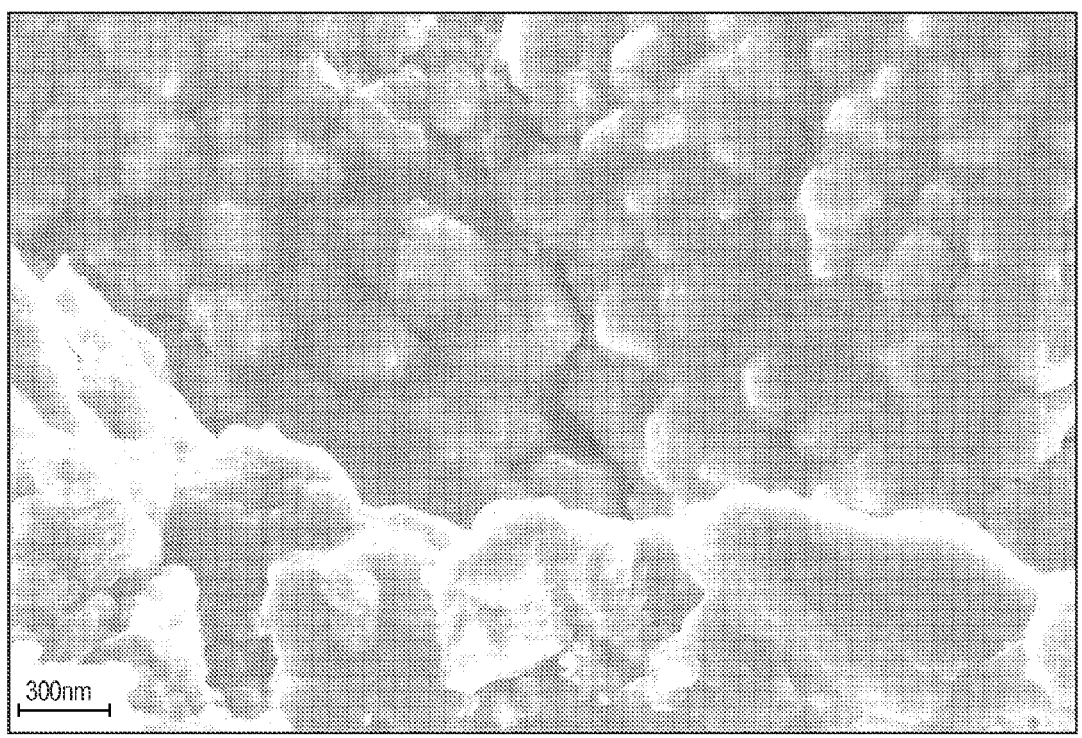

As indicated, the samples made from the dispersant of the present invention (Sample 1) exhibited very low leakage current and a high dry to wet capacitance percentage, even after life testing. FIGS. 8-10 also include FESEM photographs that were taken of the finished capacitors of Samples 1-3, respectively. As shown, the sample made from Spolostan 4P (FIG. 8) contains relatively small manganese oxide crystals that are substantially homogenously distributed through the sample, In comparison, the samples shown in FIGS. 9-10 contain a substantial number of large, unevenly distributed manganese oxide crystals.

EXAMPLE 4

18,000 μF*V/g Tantalum Powder (Capacitors 47 μF/35V)

Initially, 2×10,000 capacitor element samples were formed from tantalum anodes having a size of 4.8 mm (length)×3.4 mm (width)×3.1 mm (thickness). Each anode was embedded with a tantalum wire, pressed to a density of 5.3 g/cm$^3$, and sintered at 1500° C. for 20 minutes. The tantalum anodes were dipped into an orthophosphoric acid/water solution having a conductivity of 2.9 mS/cm and temperature of 85° C. with a formation voltage of 101 volts. The samples were dipped into a conventional aqueous solution of manganese(II) nitrate (1150 kg/m$^3$) for 150 seconds and then decomposed at 250° C. This step was repeated six times. Thereafter, a first set of samples was dipped into an aqueous solution of manganese (II) nitrate (1300 kg/m$^3$) and 3 g/dm$^3$ of Spolostan 4P and then decomposed at 250° C. to achieve the MnO$_2$ cathode. These steps were repeated two times. A second set of the samples was dipped into an aqueous solution of only manganese(II) nitrate (1300 kg/m$^3$) for 150 seconds and decomposed at 250° C. to achieve an MnO$_2$ cathode. This step was repeated two times. All of the samples were then dipped into high specific gravity manganese(II) nitrate sequentially into a graphite dispersion and in a silver dispersion and dried.

The median wet capacitance (for 30 samples) was 52 μF.

The finished capacitor elements were completed by conventional assembly technology and tested for electrical properties. The results are set forth below.

| Sample | Median of Electrical Parameters (based on 10,000 parts) | | |
|---|---|---|---|
| | DCL [μA] (soak time of 45 sec) | Dry Capacitance [μF] | Dry to Wet Capacitance [%] |
| 1 Spolostan 4P | 0.44 | 50.0 | 96.2 |
| 2 Control | 0.53 | 47.1 | 90.6 |

| Sample | Median of Electrical Parameters Before and after Life Testing (based on 25 parts) | | | |
|---|---|---|---|---|
| | DCL [μA] (soak time of 45 sec) | | Dry Capacitance [μF] | |
| | Before | After | Before | After |
| 1 Spolostan 4P | 0.39 | 0.20 | 47.6 | 47.2 |
| 2 Control | 0.54 | 0.20 | 46.3 | 46.0 |

Figure 11:
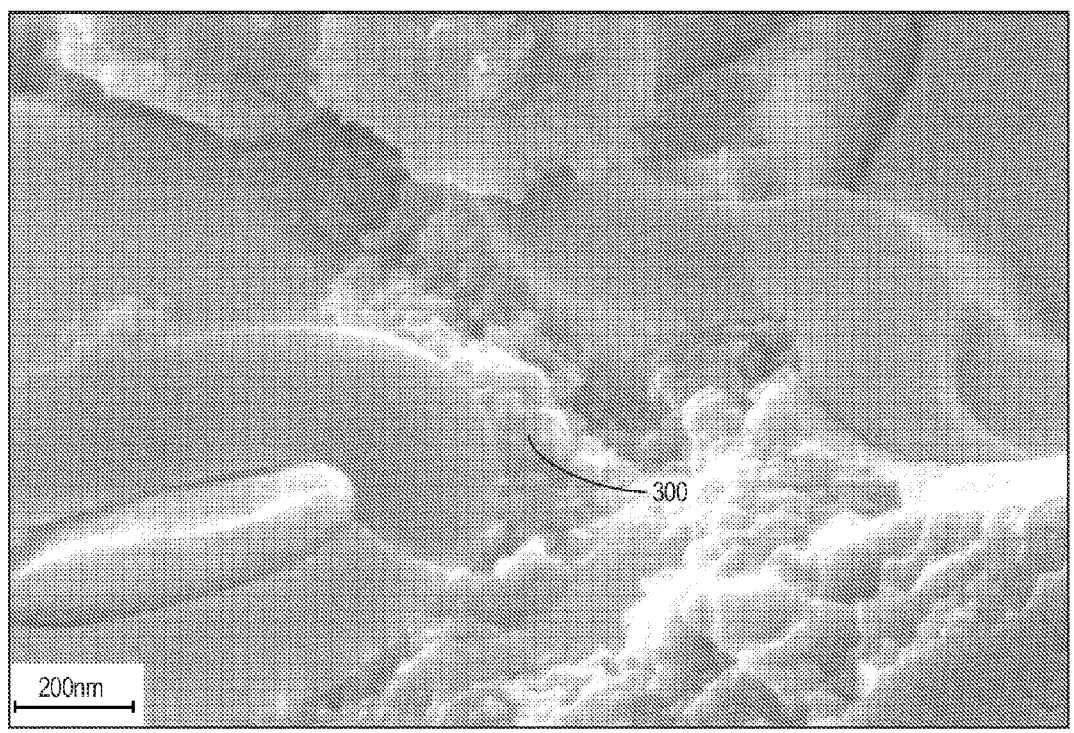
Figure 12:
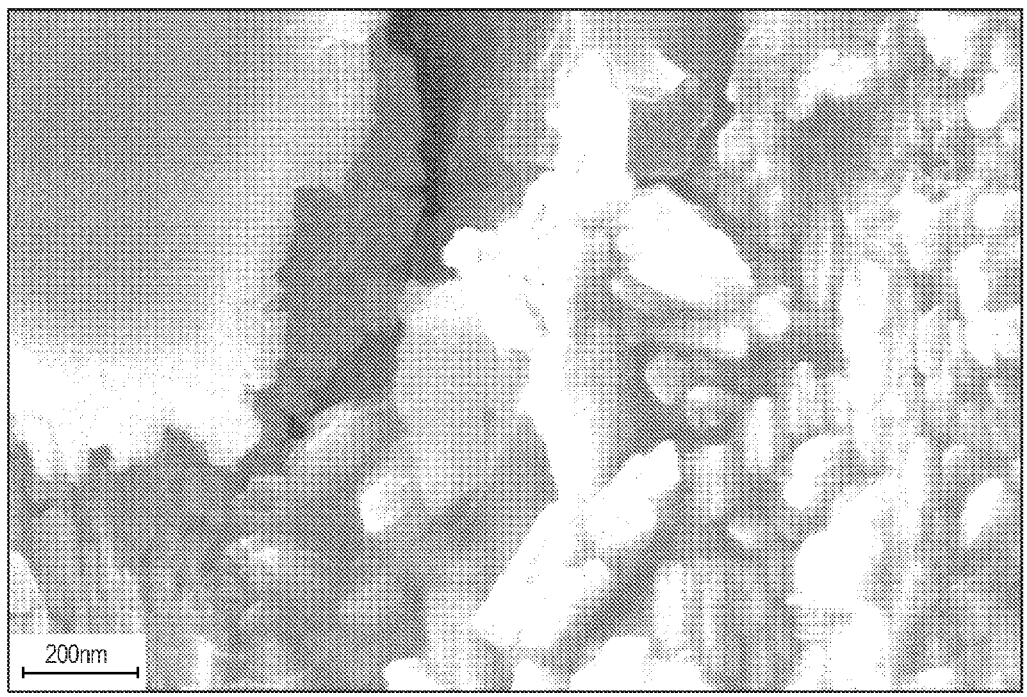

As indicated, the samples made from the dispersant of the present invention (Sample 1) exhibited very low leakage current and a high dry to wet capacitance percentage, even after life testing. FIGS. 11-12 also show FESEM photographs that were taken of the finished capacitors of Samples 1-2, respectively. As shown, the sample made from Spolostan 4P (FIG. 11) contains relatively small manganese oxide crystals that are substantially homogenously distributed through the sample. In comparison, the samples shown in FIG. 12 contain a substantial number of large, unevenly distributed manganese oxide crystals.

EXAMPLE 5

Figure 13:
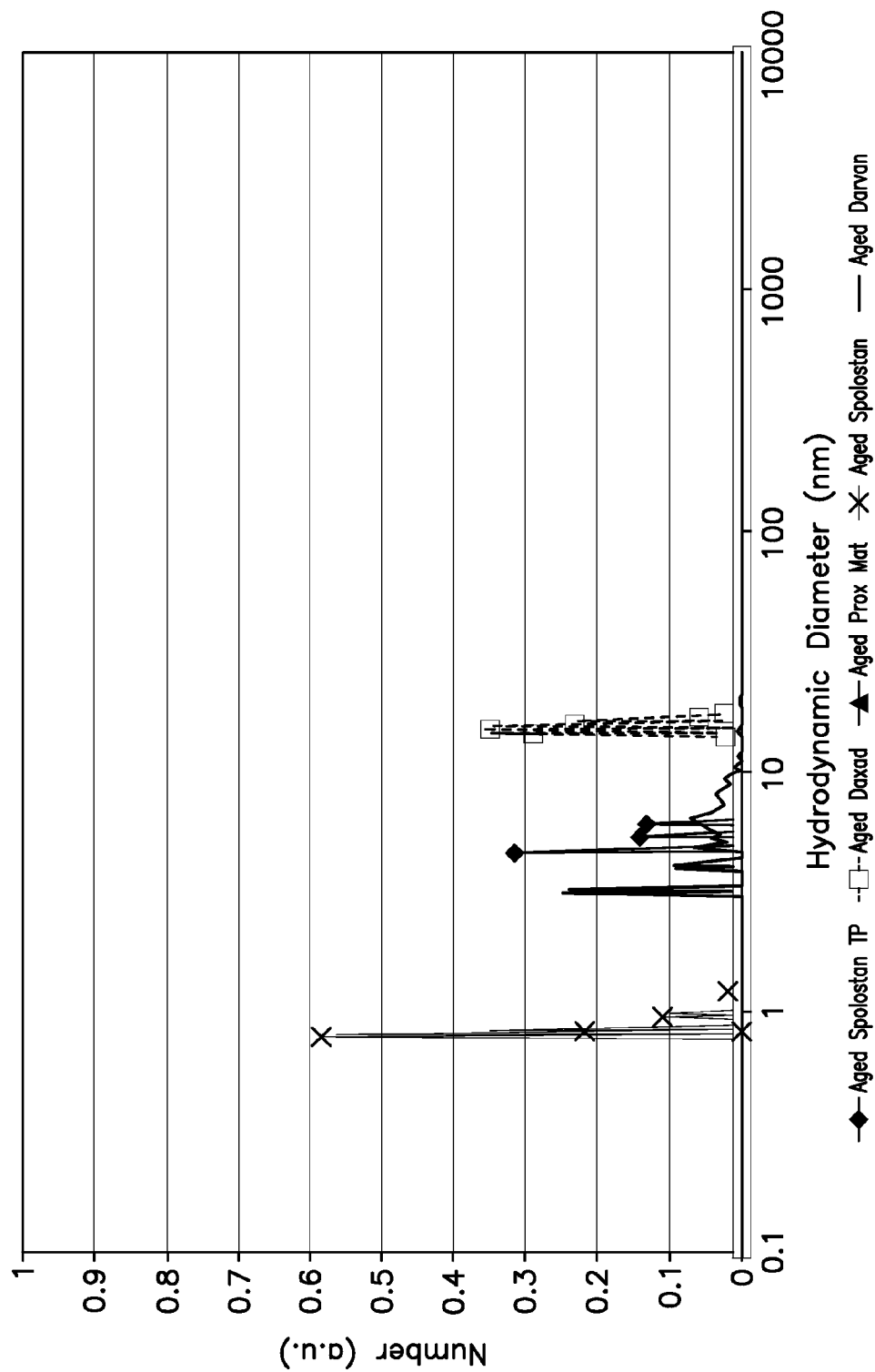
FIG. 13 shows the particle size distribution (number of particles versus the hydrodynamic diameter) for the solutions formed in Example 5.

The ability to form a colloidal suspension of nano-sized precursor particles was demonstrated. Solutions were initially prepared by dissolving 0.3 g/l of five (5) different dispersants in a conventional aqueous solution of manganese(II) nitrate (1300 kg/m³) at 20° C. The dispersants were Daxad® 11 (Geo Specialty Chemicals), Spolostan 7 (Enaspol, a.s), Proxmat PL-C 753 FP (Synthron), and Darvan® 1 (R.T. Vanderbilt Co., Inc.). Each of the solutions was allowed to age over one (1) month. The samples were then filtered through a 0.2 μm membrane filter to remove dust and other macro-sized particles before being subjected to nanoparticle size analysis using dynamic light scattering/photon correlation spectroscopy (Cordouan VASCO 3 Particle Size Analyzer). The results are shown in FIG. 13. As illustrated, colloidal suspensions were formed of various particle size distributions. To confirm that the formation of the nano-sized particles was due to the combination of the dispersant and the nitrate precursor, two (2) control samples were also formed. The first control was an aqueous solution of manganese(II) nitrate (1300 kg/m³) and the second control was a solution of 0.3 g/l of Spolostan 7 (Enaspol, a.s) in water. Upon testing, neither of the control solutions was shown to contain particulates.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for forming a solid electrolytic capacitor, the method comprising:

anodically oxidizing an anode body to form a dielectric coating, wherein the anode body is formed from a powder;

contacting the dielectric-coated anode body with a solution that contains a manganese oxide precursor and a dispersant; and pyrolytically converting the precursor to a manganese oxide solid electrolyte.

2. The method of claim 1, wherein the dispersant contains an organic compound having a hydrophilic moiety and a hydrophobic moiety, which is an aromatic or heteroatomic ring system having from 6 to 14 carbon atoms.

3. The method of claim 2, wherein the hydrophilic moiety includes a sulfonate, phosphonate, carboxylate, thiol, sulfonate ester, phosphite, phosphonite, phosphinite, phosphate, sulfate, phosphate ester, sulfoxide, sulfone, amino, or a combination thereof.

4. The method of claim 2, wherein the organic compound has the following structure, or a salt thereof:

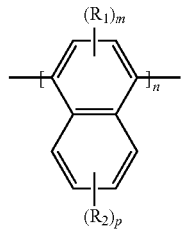

wherein,
$R_1$ is an alkyl group having from 1 to 6 carbon atoms;
$R_2$ is a hydrophilic moiety;
m is from m to 8;
p is from 1 to 8; and
n is from 1 to 100.

5. The method of claim 2, wherein the compound is a salt of a condensed naphthalene sulfonic acid.

6. The method of claim 2, wherein the salt contains a sodium cation.

7. The method of claim 2, wherein the molecular weight of the compound is about 6,000 grams per mole or less.

8. The method of claim 1, wherein the manganese oxide precursor is manganese nitrate.

9. The method of claim 1, wherein the ratio of the surface tension of water (at 20° C.) to the surface tension of the dispersant (at a concentration of 1 wt. % in water and at 20° C.) is from about 0.5 to about 2.0.

10. The method of claim 1, wherein the ratio of the surface tension of water (at 20° C.) to the surface tension of the dispersant (at a concentration of 1 wt. % in water and at 20° C.) is from about 0.8 to about 1.2.

11. The method of claim 1, wherein the surface tension of the dispersant (at a concentration of 1 wt. % in water and at 20° C.) is from about 50 to about 95 dynes per centimeter.

12. The method of claim 1, wherein the surface tension of the dispersant (at a concentration of 1 wt. % in water and at 20° C.) is from about 55 to about 75 dynes per centimeter.

13. The method of claim 1, wherein the solution contains from about 0.001 wt. % to about 5 wt. % of the dispersant.

14. The method of claim 1, wherein the solution contains from about 0.01 wt. % to about 1 wt % of the dispersant.

15. The method of claim 1, wherein the solution is an aqueous solution.

16. The method of claim 1, wherein the solution further comprises an alcohol.

17. The method of claim 1, wherein the precursor is pyrolytically converted to the oxide at a temperature of from about 150° C. to about 300° C.

18. The method of claim 1, wherein the solution is in the form of a colloidal suspension of nano-sized manganese oxide precursor particles.

19. The method of claim 18, wherein the nano-sized particles have an average diameter of from about 0.1 to about 30 nanometers.

20. The method of claim 18, wherein the nano-sized particles have an average diameter of from about 0.2 to about 10 nanometers.

21. The method of claim 18, wherein 90% or more of the particles have an average diameter of from about 0.2 to about 10 nanometers.

* * * * *